G. F. PEARSON.
SCISSORS AND SHEARS.
APPLICATION FILED JUNE 4, 1913.
1,093,726.
Patented Apr. 21, 1914.
2 SHEETS—SHEET 1.
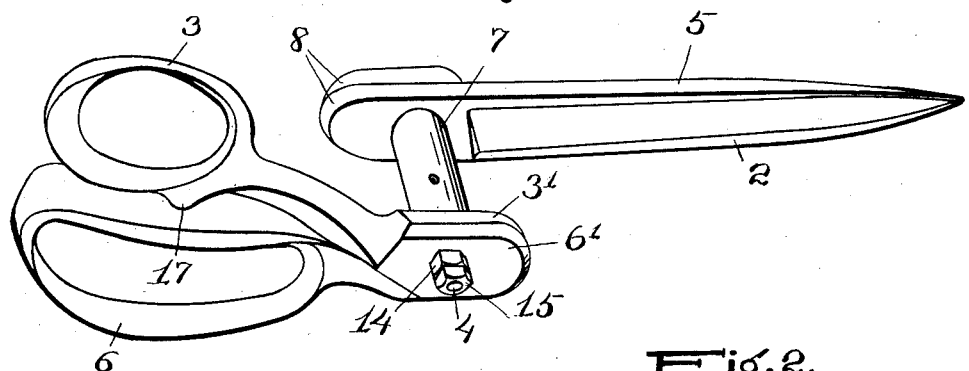
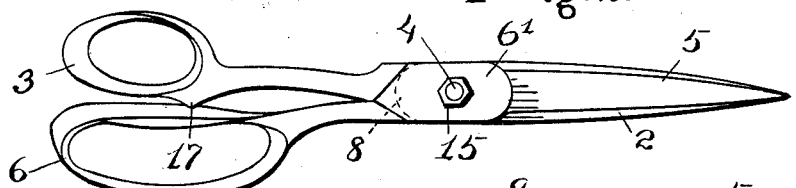
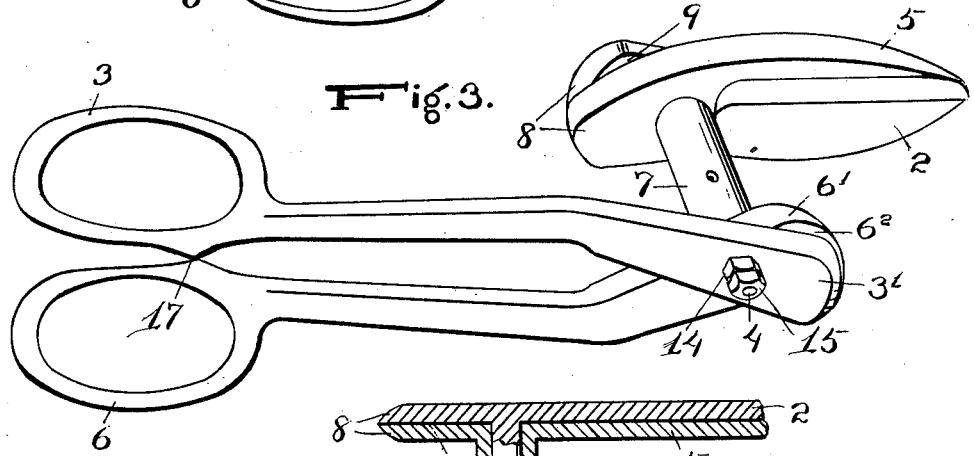
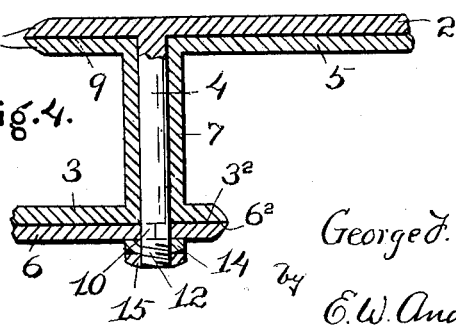
Witnesses
Stuart Hilder.
Frances W. Anderson.
Inventor
George F. Pearson
by
E. W. Anderson & Son.
his Attorneys

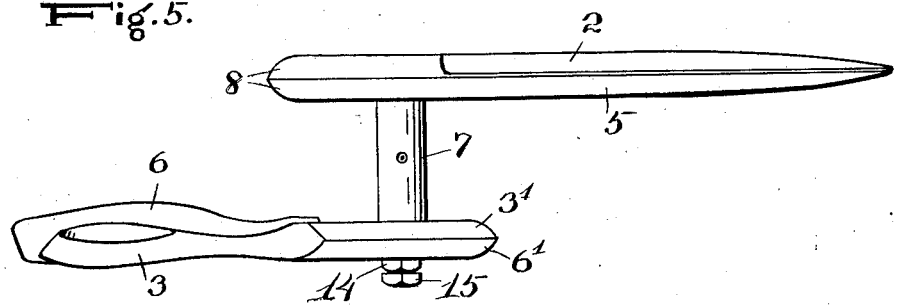
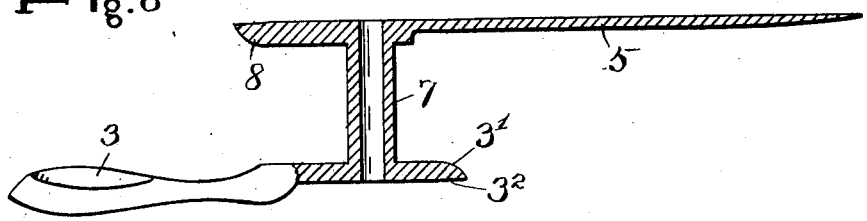
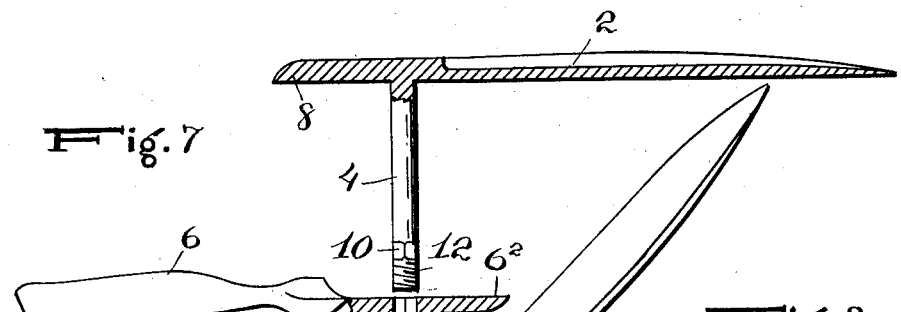
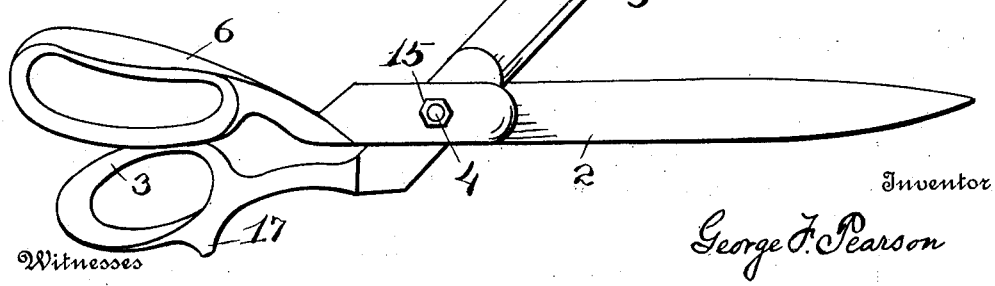

UNITED STATES PATENT OFFICE.

GEORGE F. PEARSON, OF LOWELL, MASSACHUSETTS, ASSIGNOR OF ONE-HALF TO GEORGE W. MORRISON, OF LOWELL, MASSACHUSETTS.

SCISSORS AND SHEARS.

1,093,726.  Specification of Letters Patent.  Patented Apr. 21, 1914.

Application filed June 4, 1913. Serial No. 771,676.

*To all whom it may concern:*

Be it known that I, GEORGE F. PEARSON, a citizen of the United States, resident of Lowell, in the county of Middlesex and State of Massachusetts, have made a certain new and useful Invention in Scissors and Shears; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied to tailors' shears. Fig. 2 is a plan view of the same. Fig. 3 is a perspective view of the invention as applied to tinners' shears. Fig. 4 is a central longitudinal section through the pivot, partly broken away. Fig. 5 is a side view of the invention. Fig. 6 is a detail central longitudinal section of one member of the shears. Fig. 7 includes detail central longitudinal sections of the other members of the shears. Fig. 8 is a plan view of the shears with the blades reversed.

The invention relates to scissors and shears, and it consists in the novel construction and combination of parts, as hereinafter set forth.

In the accompanying drawings, illustrating the invention, the numeral 2, indicates the lower blade of the shears, and 3, the upper handle which is connected to the lower blade by the journal bar 4. The upper blade of the shears is designated 5, and the lower handle 6, is connected rigidly to said upper blade by the hollow cylindrical bearing 7, which is made integral with the upper blade and its handle. The journal bar 4, is also designed to be rigidly secured to the lower blade or integral therewith. The length of the hollow cylindrical connection 7, of the upper blade and lower handle, in ordinary tailors' shears, is usually about two inches or sufficient to allow for free manipulation of the shears and the cloth, or other article to be cut, underneath the handles.

In order to compensate for such weakness as may be found in the angular relation of the blades and handles to the long pivotal connection, the blades are provided with offsets or heel extensions 8, in rear of the pivot, these offsets having plane bearing faces 9, of sufficient extent not only to control the shearing action of the blades, but also to facilitate a level cut by obviating the tendency of the blades to lost motion or rocking upon their pivots outwardly or at right angles to the usual movement in cutting.

The upper end of the journal bar is squared as at 10, to engage a square seat in the upper handle, and above this squared portion, the bar is threaded as at 12, to receive the bearing nut 14, and the locking nut 15. In the hollow cylindrical bearing 7, is usually made an aperture for oiling.

In these shears, the limit stop for closing is provided at 17, where one handle abuts against the other. The blade bearings and handle bearings at their pivotal portions being plane, the position of the blades can be reversed to present their cutting edges outward for facility in sharpening. The handles 3 and 6, may also be provided with rear or heel extensions 3' and 6', having plane inner surfaces 3² and 6², working in contact with each other, to maintain the handles in parallel relation and prevent any lost motion or outward rocking movement of the handles upon their pivots.

I claim:

1. A pair of shears, comprising an upper cutting blade, a lower handle, and an intermediate pivot-tube integral with said blade and handle, a lower blade, and a pivot-bar integral with the lower blade and engaging said tube and having a squared and threaded end, an upper handle engaging said squared end, bracing extensions of the blades in rear of their pivotal portions, and securing nuts engaging the threaded end of the pivot-bar, the plane of the blades and the plane of the handles being offset from each other by the tubular bearing and the pivot bar.

2. A pair of shears, comprising a lower blade, a rigid pivot-bar extending at right angles from said blade, a bracing extension of the handle having a plane bearing face in rear of the pivot, an upper handle having a squared seat engaging the upper end of the pivot-bar, an upper blade having a rigid tubular bearing and a bracing extension of the blade in rear of said bearing, a lower handle integral with the tubular extension, and securing nuts engaging the upper end of the pivot-bar, the plane of the blades and the plane of the handles being offset from each other by the tubular bearing and the pivot bar.

In testimony whereof I affix my signature, in presence of two witnesses.

GEORGE F. PEARSON.

Witnesses:
FREDERIC B. LEEDS,
CORA A. McGAUNAN.

Copies of this patent may be obtained for five cents each, by addressing the "Commissioner of Patents, Washington, D. C."